US005444470A

United States Patent [19]

Muto et al.

[11] Patent Number: 5,444,470

[45] Date of Patent: Aug. 22, 1995

[54] IMAGE FORMING APPARATUS INCLUDING ROTATABLE MAGNETIC FIELD GENERATING MEANS AND CONTROL MEANS FOR CONTROLLING IMAGE TONE

[75] Inventors: Hakaru Muto, Yokohama; Hiromi Kubota, Kawasaki, both of Japan

[73] Assignee: Canon Kabushiki Kaisha, Tokyo, Japan

[21] Appl. No.: 316,827

[22] Filed: Oct. 3, 1994

Related U.S. Application Data

[63] Continuation of Ser. No. 841,325, Feb. 25, 1992, abandoned.

[30] Foreign Application Priority Data

Feb. 28, 1991 [JP] Japan .................................. 3-055482
Jun. 25, 1991 [JP] Japan .................................. 3-153146

[51] Int. Cl.$^6$ .............................................. G01D 15/16
[52] U.S. Cl. .......................................... 347/15; 347/55
[58] Field of Search ...................... 346/153.1, 159, 155; 355/245, 246, 251; 347/55, 15; 358/298

[56] References Cited

U.S. PATENT DOCUMENTS 3,816,840 6/1974 Kotz .............................. 346/74 ES
3,879,737 4/1975 Lunde ............................ 346/74 ES
3,914,771 10/1975 Lunde et al. .................... 346/74 ES
4,122,459 10/1978 Schloemann et al. ................ 347/55
4,274,053 6/1981 Ito et al. ........................... 341/15 X
4,387,382 6/1983 Kohashi ................................ 347/55
4,454,520 6/1984 Braschler et al. ................ 346/153.1
4,486,089 12/1984 Itaya et al. .......................... 355/245
4,585,326 4/1986 Okamoto et al. .................... 355/245
4,620,203 10/1986 Nakatani et al. ................ 346/153.1
4,739,348 4/1988 Ando et al. .......................... 346/155
4,843,388 6/1989 Miyamoto ............................. 341/15
4,899,145 2/1990 Okuda et al. ......................... 341/15
5,001,501 3/1991 Imai et al. ........................ 346/160.1
5,089,832 2/1992 Muto ............................... 346/160.1

*Primary Examiner*—Benjamin R. Fuller
*Assistant Examiner*—R. Gibson
*Attorney, Agent, or Firm*—Fitzpatrick, Cella, Harper & Scinto

[57] ABSTRACT

An image forming apparatus capable of forming a tone image including an image bearing member; electrically independent plural electrodes; a rotatable magnetic field generator having plural magnetic poles to supply magnetic toner particles to a region between the image bearing member and the recording electrodes; a detector for detecting the positions of the magnetic poles of the magnetic field generator; and a controller, responsive to an output of the detector, for controlling application timing of a voltage on the recording electrodes.

11 Claims, 21 Drawing Sheets

| | | | | | | | | | | | | | | | |
|---|---|---|---|---|---|---|---|---|---|---|---|---|---|---|---|
| | | | | | | A1 | 1 | 0 | 1 | 0 | 1 | 0 | 1 | 0 | |
| | | | | | | A2 | 1 | 1 | 0 | 0 | 1 | 1 | 0 | 0 | |
| | | | | | | A3 | 1 | 1 | 1 | 1 | 0 | 0 | 0 | 0 | |
| | | | | | | A4 | 0 | 0 | 0 | 0 | 0 | 0 | 0 | 0 | |
| B7 | B6 | B5 | B4 | B3 | B2 | B1 | | | | | | | | | |
| 0 | 0 | 0 | 0 | 0 | 0 | 0 | 1 | 0 | 0 | 0 | 0 | 0 | 0 | 0 | I SUB-SCAN |
| 0 | 0 | 0 | 0 | 0 | 0 | 1 | 1 | 1 | 0 | 0 | 0 | 0 | 0 | 0 | I SUB-SCAN |
| 0 | 0 | 0 | 0 | 0 | 1 | 0 | 1 | 1 | 1 | 0 | 0 | 0 | 0 | 0 | I SUB-SCAN |
| 0 | 0 | 0 | 0 | 0 | 1 | 1 | 1 | 1 | 1 | 1 | 0 | 0 | 0 | 0 | I SUB-SCAN |
| 0 | 0 | 0 | 0 | 1 | 0 | 0 | 1 | 1 | 1 | 1 | 1 | 0 | 0 | 0 | I SUB-SCAN |
| 0 | 0 | 0 | 0 | 1 | 0 | 1 | 1 | 1 | 1 | 1 | 1 | 1 | 0 | 0 | I SUB-SCAN |
| 0 | 0 | 0 | 0 | 1 | 1 | 0 | 1 | 1 | 1 | 1 | 1 | 1 | 1 | 0 | I SUB-SCAN |
| 0 | 0 | 0 | 0 | 1 | 1 | 1 | 1 | 1 | 1 | 1 | 1 | 1 | 1 | 1 | I SUB-SCAN |
| 0 | 0 | 0 | 1 | 0 | 0 | 0 | 1 | 1 | 1 | 1 | 1 | 1 | 1 | 1 | |
| 0 | 0 | 0 | 1 | 0 | 0 | 1 | 1 | 1 | 1 | 1 | 1 | 1 | 1 | 0 | |
| 0 | 0 | 0 | 1 | 0 | 1 | 0 | 1 | 1 | 1 | 1 | 1 | 1 | 0 | 0 | |
| 0 | 0 | 0 | 1 | 0 | 1 | 1 | 1 | 1 | 1 | 1 | 1 | 0 | 0 | 0 | |
| 0 | 0 | 0 | 1 | 1 | 0 | 0 | 1 | 1 | 1 | 1 | 0 | 0 | 0 | 0 | |
| 0 | 0 | 0 | 1 | 1 | 0 | 1 | 1 | 1 | 1 | 0 | 0 | 0 | 0 | 0 | |
| 0 | 0 | 0 | 1 | 1 | 1 | 0 | 1 | 1 | 0 | 0 | 0 | 0 | 0 | 0 | |
| 0 | 0 | 0 | 1 | 1 | 1 | 1 | 1 | 0 | 0 | 0 | 0 | 0 | 0 | 0 | |

FIG. 8

| | | | | | | A1 | 1 | 0 | 1 | 0 | 1 | 0 | 1 | 0 |
|---|---|---|---|---|---|---|---|---|---|---|---|---|---|---|
| | | | | | | A2 | 1 | 1 | 0 | 0 | 1 | 1 | 0 | 0 |
| | | | | | | A3 | 1 | 1 | 1 | 1 | 0 | 0 | 0 | 0 |
| B7 | B6 | B5 | B4 | B3 | B2 | B1 / A4 | 0 | 0 | 0 | 0 | 0 | 0 | 0 | 0 |
| 0 | 0 | 0 | 0 | 0 | 0 | 0 | 1 | 1 | 1 | 1 | 1 | 1 | 1 | 1 |
| 0 | 0 | 0 | 0 | 0 | 0 | 1 | 1 | 1 | 1 | 1 | 1 | 1 | 1 | 0 |
| 0 | 0 | 0 | 0 | 0 | 1 | 0 | 1 | 1 | 1 | 1 | 1 | 1 | 0 | 0 |
| 0 | 0 | 0 | 0 | 0 | 1 | 1 | 1 | 1 | 1 | 1 | 1 | 0 | 0 | 0 |
| 0 | 0 | 0 | 0 | 1 | 0 | 0 | 1 | 1 | 1 | 1 | 0 | 0 | 0 | 0 |
| 0 | 0 | 0 | 0 | 1 | 0 | 1 | 1 | 1 | 1 | 0 | 0 | 0 | 0 | 0 |
| 0 | 0 | 0 | 0 | 1 | 1 | 0 | 1 | 1 | 0 | 0 | 0 | 0 | 0 | 0 |
| 0 | 0 | 0 | 0 | 1 | 1 | 1 | 1 | 0 | 0 | 0 | 0 | 0 | 0 | 0 |
| 0 | 0 | 0 | 1 | 0 | 0 | 0 | 1 | 1 | 1 | 1 | 1 | 1 | 1 | 1 |
| 0 | 0 | 0 | 1 | 0 | 0 | 1 | 0 | 1 | 1 | 1 | 1 | 1 | 1 | 1 |
| 0 | 0 | 0 | 1 | 0 | 1 | 0 | 0 | 0 | 1 | 1 | 1 | 1 | 1 | 1 |
| 0 | 0 | 0 | 1 | 0 | 1 | 1 | 0 | 0 | 0 | 1 | 1 | 1 | 1 | 1 |
| 0 | 0 | 0 | 1 | 1 | 0 | 0 | 0 | 0 | 0 | 0 | 1 | 1 | 1 | 1 |
| 0 | 0 | 0 | 1 | 1 | 0 | 1 | 0 | 0 | 0 | 0 | 0 | 1 | 1 | 1 |
| 0 | 0 | 0 | 1 | 1 | 1 | 0 | 0 | 0 | 0 | 0 | 0 | 0 | 1 | 1 |
| 0 | 0 | 0 | 1 | 1 | 1 | 1 | 0 | 0 | 0 | 0 | 0 | 0 | 0 | 1 |

| BIT | MEANING | LOGIG |
|---|---|---|
| $b_0$ | DATA OF ZONE A | 0:W 1:BK |
| $b_1$ | DATA OF ZONE B | |
| $b_2$ | DATA OF ZONE C | |
| $b_3$ | DATA OF ZONE D | |
| $b_4$ | DONT CARE | |
| $b_5$ | | |
| $b_6$ | | |
| $b_7$ | | |

| DATA BIT ADDRESS | 0 | 1 | 2 | 3 | 4 | 5 | 6 | 7 |
|---|---|---|---|---|---|---|---|---|
| 0 | 0 | 0 | 0 | 0 | | | | |
| 1 | 0 | 0 | 0 | 0 | | | | |
| 2 | 1 | 0 | 0 | 0 | | | | |
| 3 | 0 | 1 | 0 | 0 | | | | |
| 4 | 0 | 1 | 0 | 0 | | | | |
| 5 | 1 | 0 | 0 | 1 | | | | |
| 6 | 1 | 0 | 0 | 1 | | | | |
| 7 | 1 | 0 | 0 | 1 | | | | |
| 8 | 1 | 1 | 0 | 0 | | | | |
| 9 | 1 | 1 | 0 | 0 | | | | |
| A | 1 | 1 | 0 | 1 | | | | |
| B | 1 | 1 | 0 | 1 | | | | |
| C | 1 | 1 | 1 | 0 | | | | |
| D | 1 | 1 | 1 | 0 | | | | |
| E | 1 | 1 | 1 | 1 | | | | |
| F | 1 | 1 | 1 | 1 | | | | |

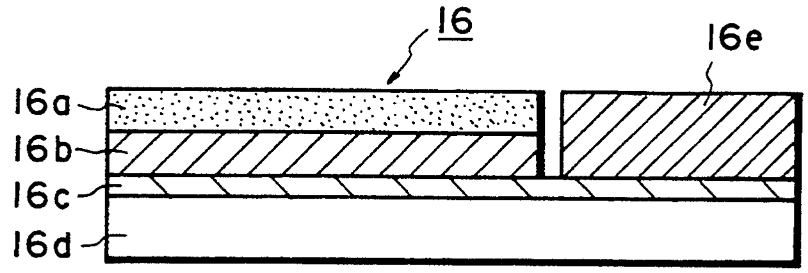
FIG. 27
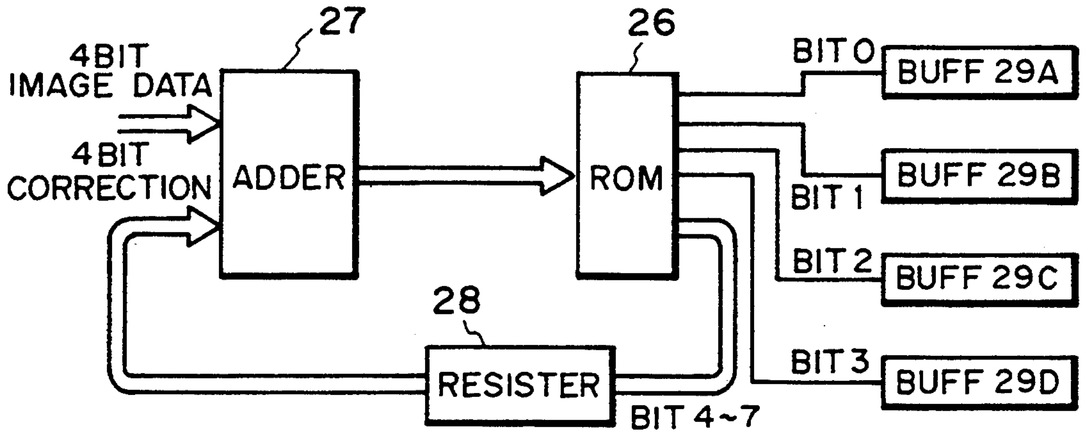
FIG. 28A
| BIT | MEANING | LOGIG |
|---|---|---|
| $b_0$ | DATA OF ZONE A | 0:W 1:BK |
| $b_1$ | DATA OF ZONE B | |
| $b_2$ | DATA OF ZONE C | |
| $b_3$ | DATA OF ZONE D | |
| $b_4$ | SIGN OF CORR FOR NEXT IMAGE | 0:ADD 1:SUB |
| $b_5$ | 3RD BIT OF CORR DATA | |
| $b_6$ | 2ND BIT OF CORR DATA | |
| $b_7$ | 1 ST BIT OF CORR DATA | |
FIG. 28B

| DATA BIT ADDRESS | 0 | 1 | 2 | 3 | 4 | 5 | 6 | 7 | DIFFE-RENCE |
|---|---|---|---|---|---|---|---|---|---|
| 0 | 0 | 0 | 0 | 0 | 0 | 0 | 0 | 0 | ±0 |
| 1 | 0 | 0 | 0 | 0 | 0 | 0 | 0 | 1 | +1 |
| 2 | 1 | 0 | 0 | 0 | 1 | 0 | 0 | 1 | -1 |
| 3 | 0 | 1 | 0 | 0 | 0 | 0 | 0 | 0 | ±0 |
| 4 | 0 | 1 | 0 | 0 | 0 | 0 | 0 | 1 | +1 |
| 5 | 1 | 0 | 0 | 1 | 1 | 0 | 0 | 1 | -1 |
| 6 | 1 | 0 | 0 | 1 | 0 | 0 | 0 | 0 | ±0 |
| 7 | 1 | 0 | 0 | 1 | 0 | 0 | 0 | 1 | +1 |
| 8 | 1 | 1 | 0 | 0 | 1 | 0 | 0 | 1 | -1 |
| 9 | 1 | 1 | 0 | 0 | 0 | 0 | 0 | 0 | ±0 |
| A | 1 | 1 | 0 | 1 | 1 | 0 | 0 | 1 | -1 |
| B | 1 | 1 | 0 | 1 | 0 | 0 | 0 | 0 | ±0 |
| C | 1 | 1 | 1 | 0 | 0 | 0 | 0 | 0 | ±0 |
| D | 1 | 1 | 1 | 0 | 0 | 0 | 0 | 1 | +1 |
| E | 1 | 1 | 1 | 1 | 1 | 0 | 0 | 1 | -1 |
| F | 1 | 1 | 1 | 1 | 0 | 0 | 0 | 0 | ±0 |

IMAGE FORMING APPARATUS INCLUDING ROTATABLE MAGNETIC FIELD GENERATING MEANS AND CONTROL MEANS FOR CONTROLLING IMAGE TONE

This application is a continuation of application Ser. No. 07/841,325 filed Feb. 25, 1992 abandoned.

FIELD OF THE INVENTION AND RELATED ART

The present invention relates to an image forming apparatus comprising a recording electrode and an image bearing member (sheet) having a layer capable of retaining electric charge on its surface, in which a recording voltage is applied therebetween, while toner image is supplied between the recording electrode and the sheet, so that the toner is deposited to form an image on the sheet.

Such an image forming process is disclosed in U.S. Pat. Nos. 3,879,737, 3,914,771, 4,739,348, 5,001,501, 3,816,840 or the like. The process is shown in FIG. 2 in which electrically conductive and magnetic toner particles 1 (toner) are conveyed on a non-magnetic cylindrical member 3 in a direction indicated by an arrow A by a rotating magnet 2. The toner is passed in contact with a recording electrode 4 of composed electrically conductive material. When the toner is physically contacted to a surface insulating layer of the image bearing member 5, a voltage is applied between the conductive layer 7 of the image bearing member 5 and the recording electrode 4, so that the toner is deposited on the image bearing member 5. In this manner, an image is formed on the image bearing member. It is noted that the distribution of the toner 1 corresponds to or is substantially proportional to the magnetic force distribution of the rotating magnet 2. This will be described in detail hereinafter.

FIG. 3 is an enlarged detailed view of the recording electrode 4 of FIG. 2. Recording position 4-1 contributes to the recording operation using the recording electrodes 4 and is mounted on a projection 9 formed on the non-magnetic cylinder 3. The longitudinally arranged apertures 4-2 are formed in a base plate 4-4. Through the apertures, the toner 1 aligned and conveyed on the cylinder 3 by the rotating magnet 2 is conveyed in the direction A and passed through the apertures. The driving elements 4-3 are VFD drivers (MSG for example, an 1163, available from Oki Denki Kabushiki Kaisha, Japan).

When the toner 1 comes to and is aligned on the recording electrodes 4 on the projection 9, the toner 1 is contacted to the image bearing member, as shown in FIG. 2, the electric charge is injected or not injected (discharge) into the image bearing member 5, depending on the voltage applied to the electrodes 4 of the recording position 4-1. Where an electric charge is injected into the image bearing member 5, the toner 1 is attracted by the coulomb force, but where the coulomb force is not produced, the toner 1 is not attracted. The aligned toner 1 having passed through the recording position 4-1 is conveyed to the downstream side of the projection by the rotating magnet 2, and is thereby moved away from the image bearing member. In this manner, it is released from the influence of the recording electrode, and therefore, the toner 1 is not deposited on the image bearing member 5. The amount of electric charge injection into the image bearing member influences to the alignment of the toner particles on the electrodes.

FIG. 4 is a block diagram for illustrating the influence. The internal structure of the driving element 4-3 (FIG. 3) is shown by 4-3*a*, 4-3*b* and 43*c*. A shift register 4-3*a* latches image signals in accordance with the image transfer clock signal (3) and the image signal (2). A latch 4-3b is provided to permit parallel output of the image signal (2) latched by the shift register 4-3*a* to the driving element 4-3. A driver 4-3*c* functions to convert the voltage to a sufficient level for recording the latched output of the latch 4-3*b*.

FIG. 5 is a view of a print sample, which shows the record density of the toner image on the image bearing member and the alignment state of the toner. When the toner is not sufficiently aligned as shown in FIG. 2, that is, when the amount of the toner is small between the electrodes 4 and the image bearing member 5, the toner 1 is contacted to the image bearing member 5 at a small area with the result of lower recorded image density (b point in FIG. 5). On the other hand, when the amount of the toner is large between the electrodes 4 and the image bearing member 5, the record density is high (a point in FIG. 5).

As will be understood from the foregoing description, the density of the recorded image varies even if the image datum consist of two levels, i.e., 0 and 1.

SUMMARY OF THE INVENTION

It is an object of the present invention to provide a reproducible image forming apparatus capable of black and white image and tone image.

It is another object of the present invention to provide an image forming apparatus wherein the variation of the toner particle chain depending on the position of the magnetic pole is positively utilized.

It is a further object of the present invention to provide an image forming apparatus wherein the variation of the toner amount between the image bearing member and the recording electrodes is positively used.

According to an aspect of the present invention, there is provided an image forming apparatus capable of forming a tone image, including an image bearing member; electrically independent plural electrodes; rotatable magnetic field generating means having plural magnetic poles to supply magnetic toner particles between the image bearing member and the recording electrodes; a detector for detecting the positions of the magnetic poles of said magnetic field generating means; and means responsive to an output of the detector, for controlling and application timing of a voltage of the recording electrodes.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 8 shows an example of image data in a page memory.

FIG. 27 is an enlarged sectional view of a part of a recording material.

FIG. 28A and 28B are a block diagram of the density pattern generating device according to another embodiment and a bit map of the converting ROM.

DESCRIPTION OF THE PREFERRED EMBODIMENTS

Embodiment 1

Figure 1:
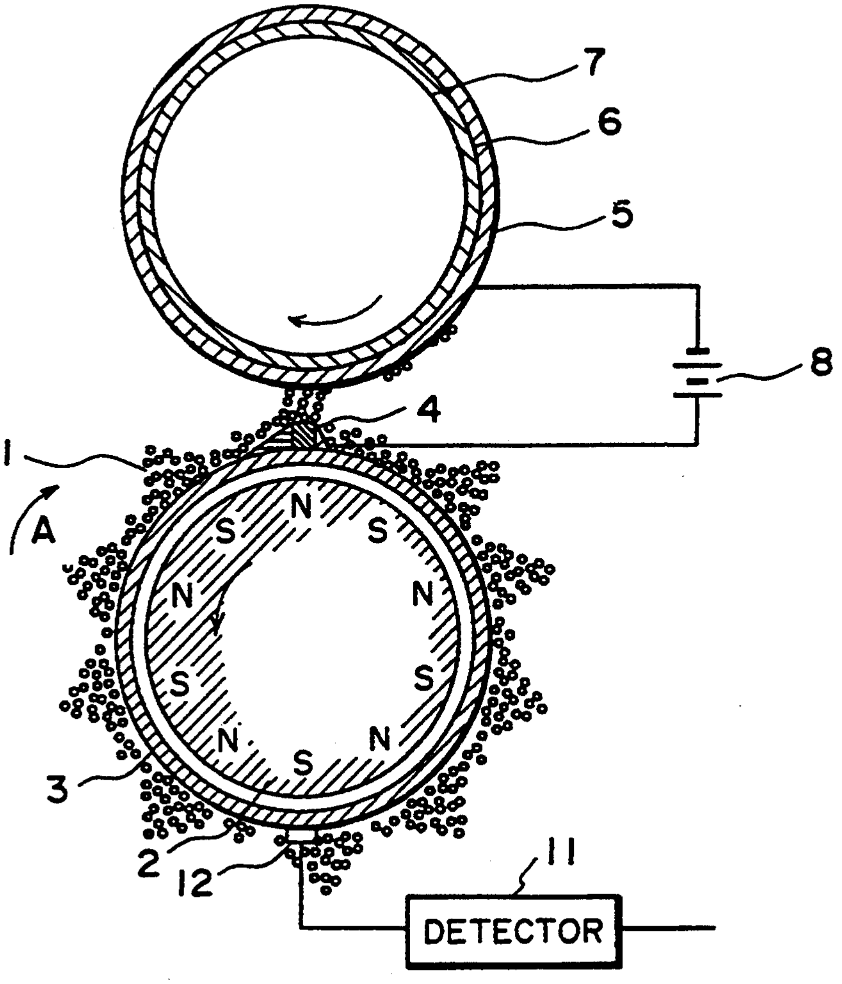
FIG. 1 is a sectional view of an image forming apparatus according to an embodiment of the present invention.

Referring to the accompanying drawings, an embodiment of the present invention will be described in detail. In the following descriptions, the same reference numerals as used in the foregoing description are assigned to elements having the corresponding functions, and the descriptions thereof are omitted for simplicity.

FIG. 1 is a sectional view of an apparatus according to this embodiment of the present invention. The voltage source 8 and the recording electrodes 4 are the same as described hereinbefore. A toner alignment detector 12 comprises a Hall element providing different output voltage in accordance with an alternating magnetic field in the toner powder by the rotational magnet 2, or a combination of an LED element and a photodetector. It may be in the form of a photoelectric transducer providing different output voltages in accordance with transmission or reflection amount of the light, or a power supply type converter providing different output voltages in accordance with density or alignment degree of the toner particles, using the electric conductivity of the toner.

In this example, the toner alignment detector 12 is disposed 90 degrees (face) away from the recording electrode 4. However, the position is not limiting. If the output phase of the toner alignment detector 12 is electrically corrected, the position thereof is not limited in relation to the rotating magnet, as will be understood by one skilled in the art.

Figure 4:
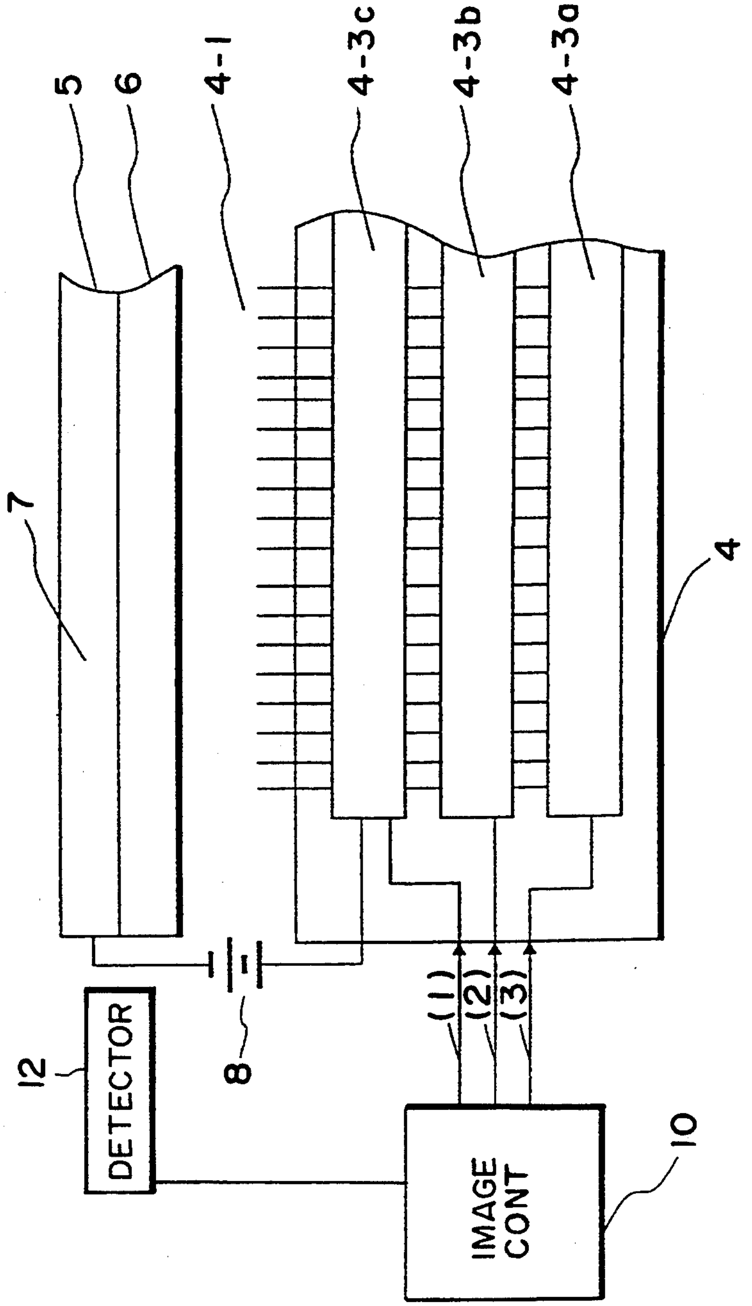
FIG. 4 is a circuit diagram for driving the recording electrodes.
Figure 6:
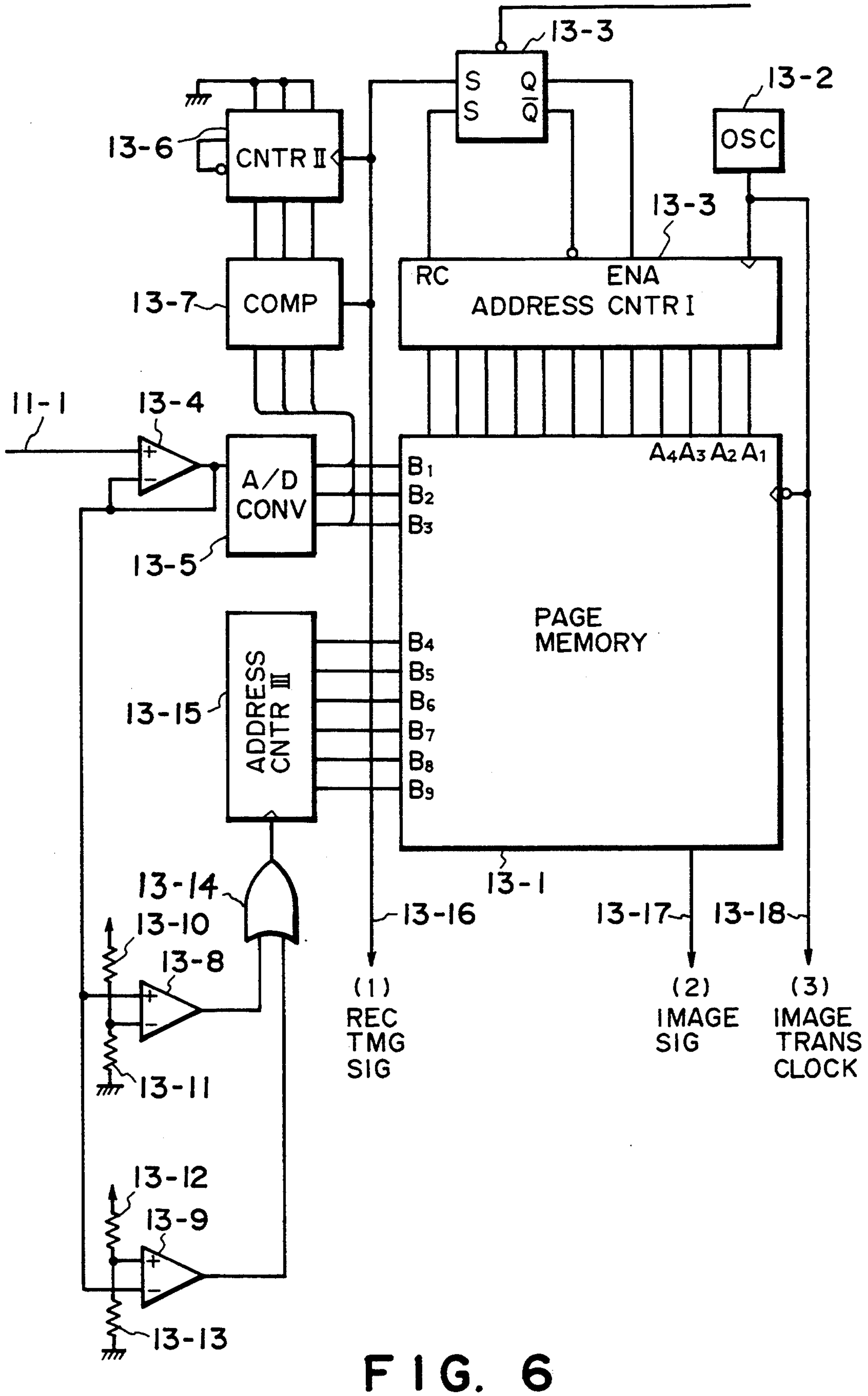
FIG. 6 is a block diagram of an image controller.

Referring to FIG. 6, a line 11-1 supplies the output of the toner alignment detector 11 to an image controller 13 which is generally shown in FIG. 4. The peripheral speeds of the image bearing member 5 and the rotating magnet 2 are the same. FIG. 6 shows details of the image controller 13. It comprises a page memory 13-1. The image data are written therein in the direction of the columns in accordance with the density level, and the image data in the direction of lines in accordance with the individual recording electrodes 4.

In this embodiment, the image data is supplied from information equipment such as a host computer or the like (not shown). The controller comprises an oscillator 13-2 producing outputs which are used as clockpulses for image transfer or internal logic of the image controller 13. A first address counter 13-3 increments the address of the page memory 13-1. An R-S flip-flop circuit (F—F) 13-3 controls the first address counter 13-3. An operational amplifier 13-4 receives the outputs from the toner alignment detector 12. An A/D converter 13-5 converts the analog output from the toner alignment detector 12 into digital signals. In this embodiment, 8-level image data are handled, and 3 bit digital signals are produced. A second counter 13-6 increments in accordance with an output of a comparator 13-7 which will be described in detail hereinafter. The comparator 13-7 produces a pulse when the output of the A/D converter 13-5 is the same as the output of the second counter 13-6. An operational amplifier 13-8 receives as the non-reversing input the output of the toner alignment detector 12 amplified by the operational amplifier 13-4, and it receives at the reversing input the voltage divided by the registers 13-10 and 13-11.

The divided voltage is selected so that it is slightly lower than the maximum level supplied from the toner alignment detector 12, and it produces a pulse output when the voltage from the toner alignment detector 12 exceeds the selected level. Similarly, the operational amplifier 13-9 receives the output voltage of the toner alignment detector 12 at its reversing input. The non-reversing input thereof receives a divided voltage provided by the registers 13-12 and 13-13.

Since the divided voltage is selected so that it is slightly higher than the output voltage of the toner alignment detector 12, and therefore, when the output of the toner alignment detector becomes low, a pulse voltage is outputted. An OR-gate 13-14 produced a logical sum, that is, either the pulse of the operational amplifier 13-8 or the operational amplifier 13-9. A third address counter 13-15 functions for the column direction of the page memory 13-1. It increments in accordance with an output of the OR-gate 13-14. The record timing signals 13-16 are the output of the image controller 10 and are applied to the recording electrode shown in FIG. 4.

The image signals 13-17 and the image transfer clock signals 13-18, are shown in FIG. 6.

Figure 7:
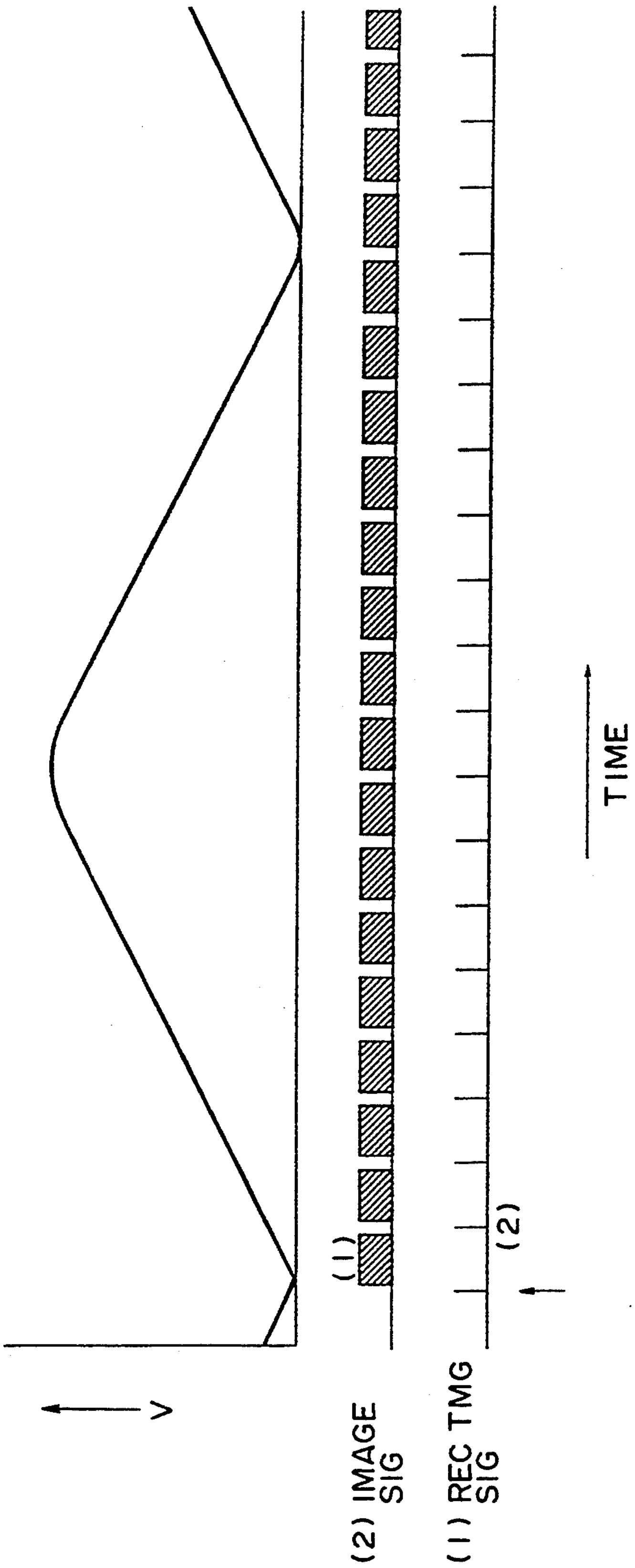
FIG. 7 is a timing chart.

Referring to FIG. 7, there is shown a timing chart, in which the output voltage of the toner alignment detector 12 is 0 at time $t_1$, and therefore, the output of the A/D converter is also 0. In addition, the output of the second counter 13-6 is also 0 (initial state).

Therefore, the output of the comparator 13-7 is high level. Then, the change from the low level to the high level increments the second counter 13-6, so that the output thereof changes with the result of low level at the output of the comparator 13-7. When the output of the comparator becomes high level, the R-S flip-flop circuit 13-13 is set, and therefore, the output Q becomes high. In response thereto, the address counter is enabled to start counting. In other words, the reading of the page memory 13-1 is started, and the image data for one line are supplied to the recording electrode 4 as the image signals 13-17.

The address counter 13-13 having completed instruction of the addresses for one line, resets the R-S flip-flop circuit 13-3 by its own wriggle carry, and the operation of the first address counter 13-3 stops. The image signals read out of the page memory 13-1 are indicated by (1)in FIG. 7. When the level of the output signal of the toner alignment detector 12 further increases, it reaches the level of the incremented second counter 13-6, upon which the comparator 13-7 produces an output. The output pulse becomes the record timing signal 13-16 and is applied to the recording electrode 4. The pulse is shown in FIG. 7 by (2).

When this is repeated 8 times, the operational amplifier 13-8 produces a pulse to increment the third counter 13-15 to designate the address in the column direction in the page memory 13-1.

FIG. 8 shows memory data in the page memory 3-1. In this case, one line is constituted by 8 bit. In other words, in FIG. 6, the address counter 13-3 is an octal counter.

Figure 9A:
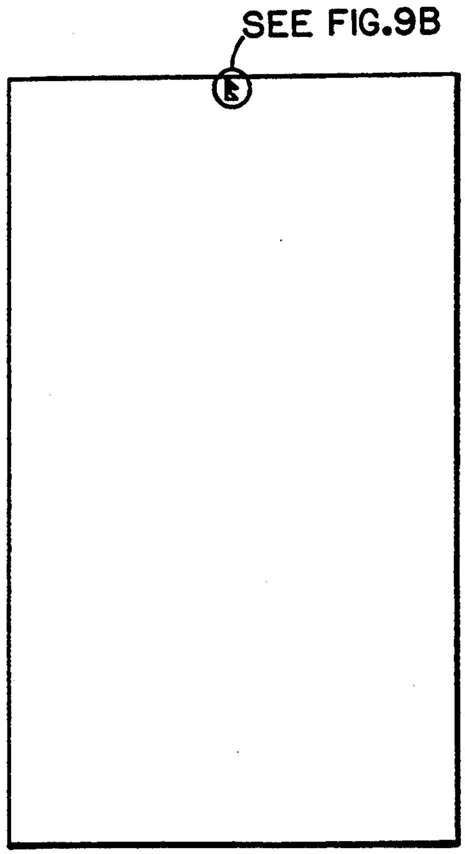
FIG. 9A and 9B shows a print sample provided by an apparatus according to a first embodiment of the present invention, and an enlarged portion thereof, respectively.
Figure 9B:
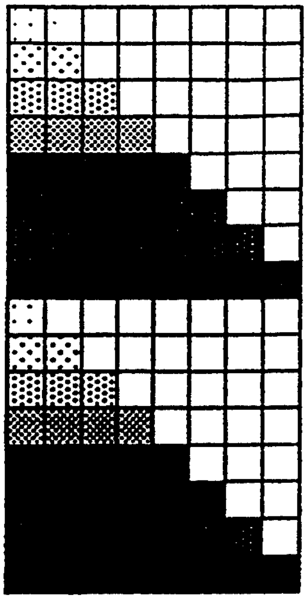

Referring to FIG. 9, there is shown a sample of a print actually produced by the apparatus of this embodiment.

Embodiment 2

In the first embodiment, the tone gradation exists in the sub-scan direction, as shown in FIG. 9. In the second embodiment, which will be described below, printing is performed with gradation in the main scan direction.

In this embodiment, a print operation is effected only with the falling portion of the output of the toner alignment detector 12 indicated by a thick line in FIG. 7, and the binary level image data supplied to the recording electrodes are sequentially read out and printed from the high density data. The image bearing member 5 shown in FIG. 1, is driven by an unshown pulse motor or the like, and one line in the sub-scan direction is incremented, while the output of the toner alignment detector 12 changes from the maximum to the minimum.

Figure 10:
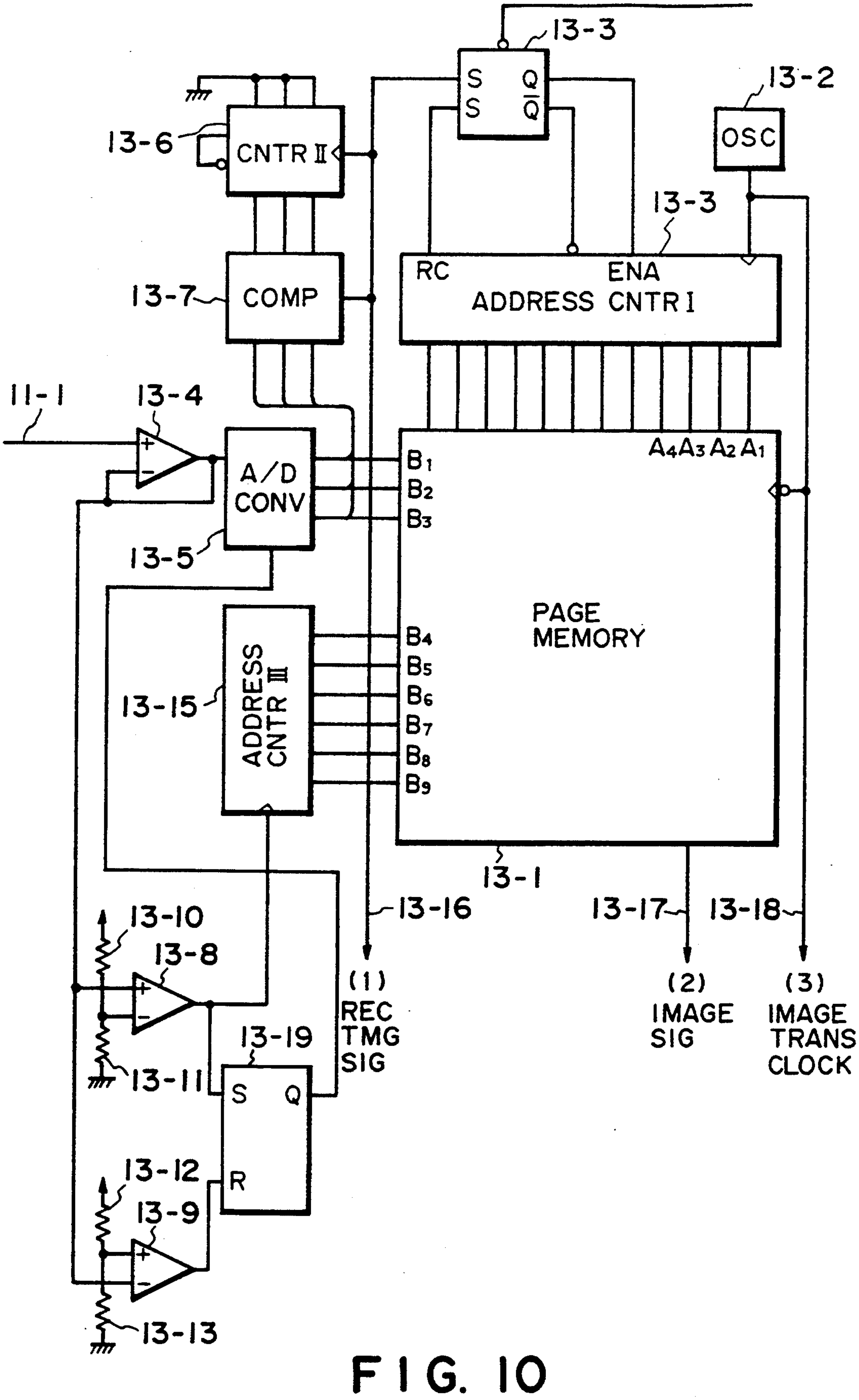
FIG. 10 is a circuit diagram of an image controller of an apparatus according to a second embodiment of the present invention.

Referring to FIG. 10, the second embodiment will be described. The same reference numerals as in FIG. 6 are assigned to element having the corresponding functions.

The output of the operational amplifier 13-8 for detecting the maximum output of the toner alignment detector 11 is connected to a clock terminal of the address counter III, and is connected to a set terminal of an R-S flip-flop circuit 13-19 which is added for controlling the A/D converter 13-5. An output of the operational amplifier 13-9 for detecting the minimum of the output of the toner alignment detector 11 is connected to the resets terminal of the R-S flip-flop circuit 13-19. The output terminal Q of the R-S flip-flop circuit 13-19 is connected to an ENABLE contact of the A/D converter 13-5. When a logic 1 is supplied to the ENABLE contact, the A/D converter 13-5 operates.

Figures 11, 12:
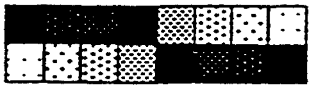
FIG. 11 shows image data in a page memory in an apparatus according to the second embodiment of the present invention.
FIG. 12 shows a print sample provided by an apparatus according to the second embodiment of the present invention.

FIG. 11 shows the image density data written in the page memory 13-1. FIG. 12 shows a sample of the print.

In this embodiment, the data is read out and printed from the high density data. Therefore, the electric charge on the image bearing member 5 is not electrically discharged by the conductive magnetic toner 1, and therefore, good images can be produced, as shown in FIG. 12.

In this embodiment, a print having the toner gradation is shown, using the falling portion of the erection of the toner chain. The same advantageous effects can be provided when the rising portion is used or when both the falling and rising portions are used.

As described in the foregoing, according to this embodiment, the multi-level image data to be applied to the electrodes are supplied in accordance with the alignment state of the toner particles. Therefore, the image density corresponds to the alignment state of the toner, and therefore, the recorded image has good density gradation.

In addition, since the signal voltages are not required to be changed for the recording, and the structure of the recording system is simplified.

Embodiment 3

Figure 2:
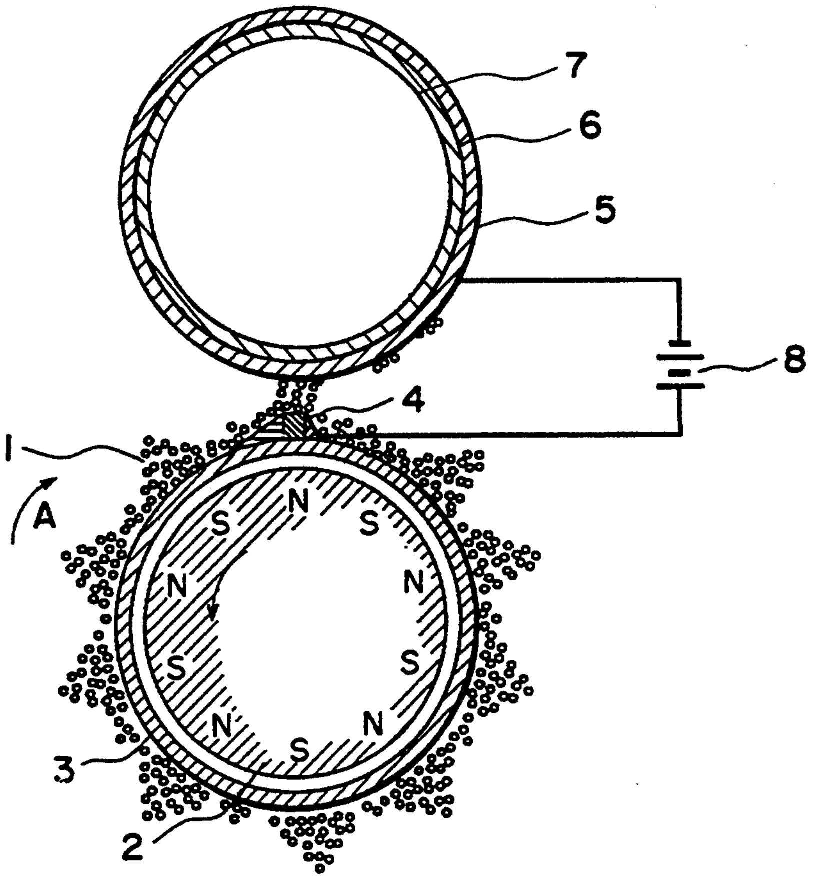
FIG. 2 is a sectional view of an image forming apparatus for illustrating the image forming process.
Figure 13:
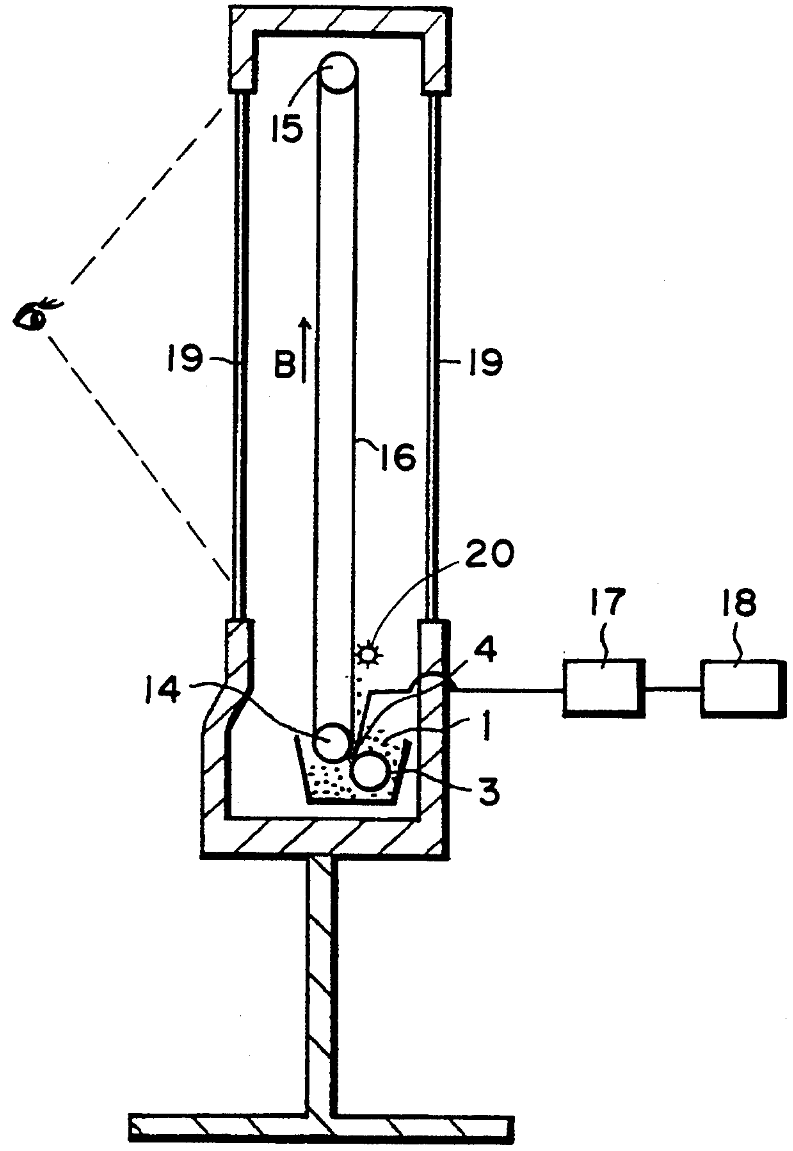
FIG. 13 is a sectional view of an image forming apparatus according to an embodiment of the present invention.

Referring to FIG. 13, there is shown a display apparatus using the recording process as described in conjunction with FIG. 2. As shown in FIG. 13, the display apparatus comprises an image bearing member 16 in the form of a belt stretched around a driving roller 14 and a follower roller 15. The toner 1 is supplied to the recording electrode 4 by rotation of a rotary magnet, and the signal voltage is applied from the record controller 17 in accordance with the image information so as to selectively deposit the toner on the image bearing member, thus forming an image corresponding to the image information. The formed image can be seen through a window 19. The record controller 17 applies to the recording electrode 4 signal voltages proper to the recording corresponding to the image data supplied from an interface 18.

Figure 14:
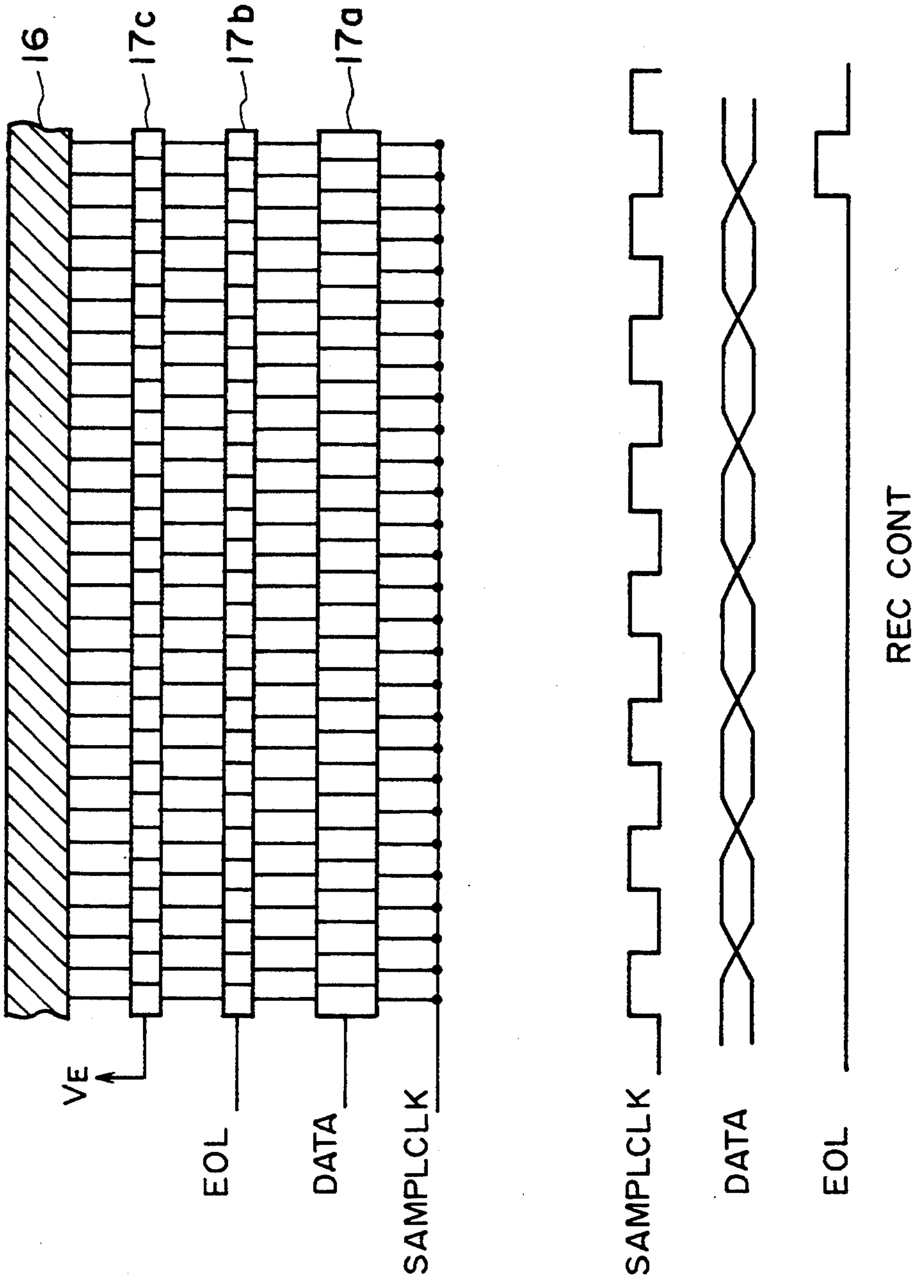
FIG. 14 illustrates the record controller used in the apparatus of FIG. 13.

FIG. 14 is a timing chart of the signals of the image data supplied from the interface 18 to the record controller 17. Referring to the timing chart, the function of the record controller 17 will be described.

The image data are recorded in a shift register 17*a* for each of the picture elements in synchronism with the rising of the sampling clock. Then, the image data for one line is developed in the shift register 17*a*. When the image data are developed in the shift register 17*a*, the image data in the shift register 17*a* are latched in a line buffer 17 in response to a line end signal EOL. The image data latched in the line buffer 17*b* are converted to signal voltages required for the recording by a recording electrode driver 17*c*, and is applied to the recording electrodes 4, so that an image is formed on the image bearing member 16.

The toner 1 deposited on the image bearing member 11 is displayed through the display window 17, and is removed from the image bearing member 16 into the developer container by a cleaning member 20, and the image bearing member is supplied again to the recording position.

Referring to FIGS. 15–26, a third embodiment of the present invention will be described which is in the form of an image display apparatus.

Figure 15:
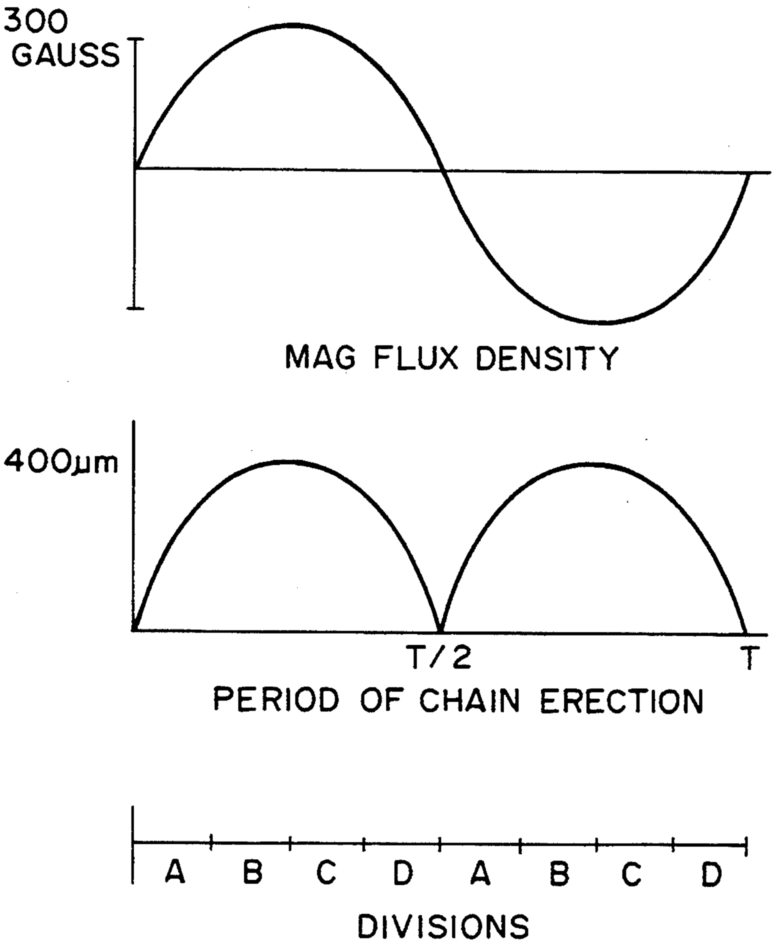
FIG. 15 illustrates the frequency division for the rotating magnetic field.
Figure 16:
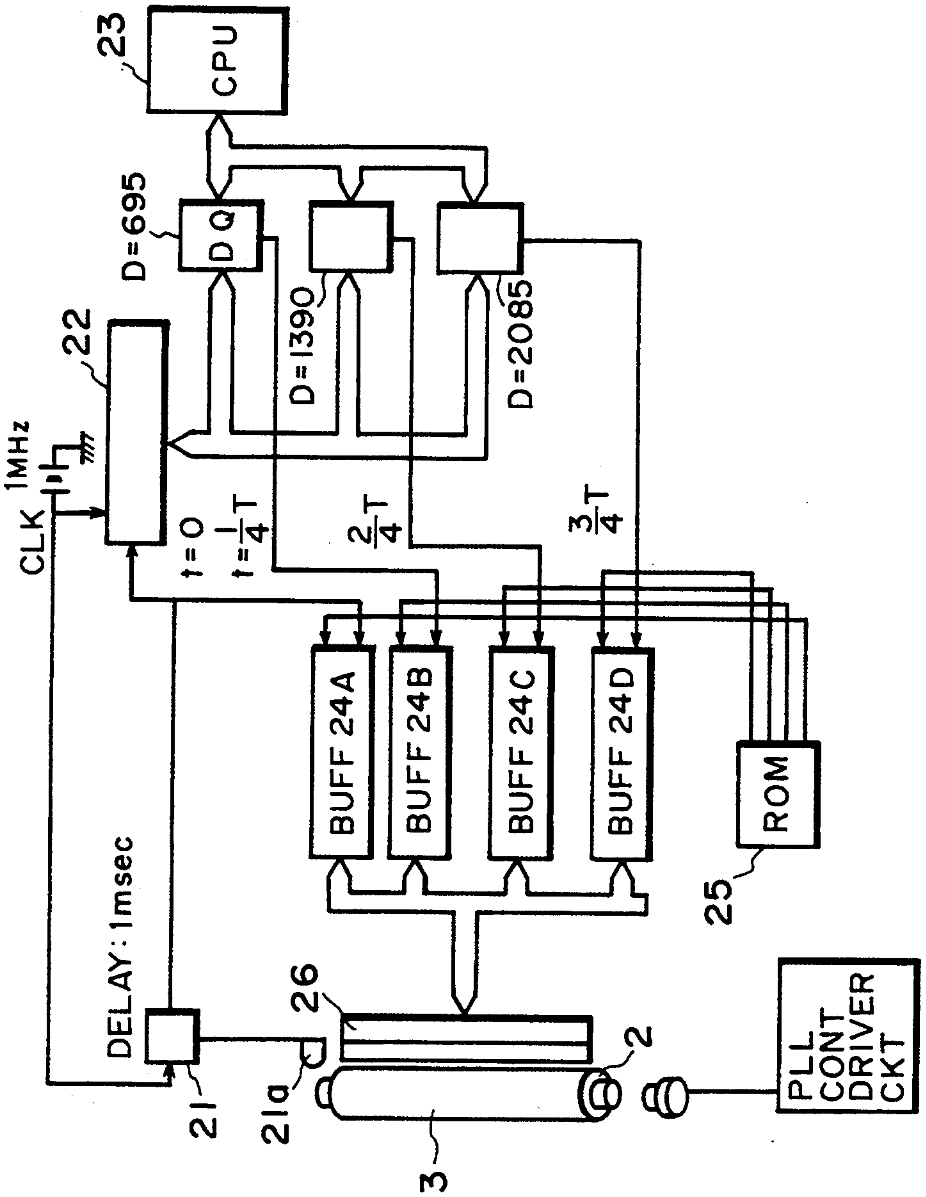
FIG. 16 is a block diagram of a frequency divider circuit.
Figure 17:
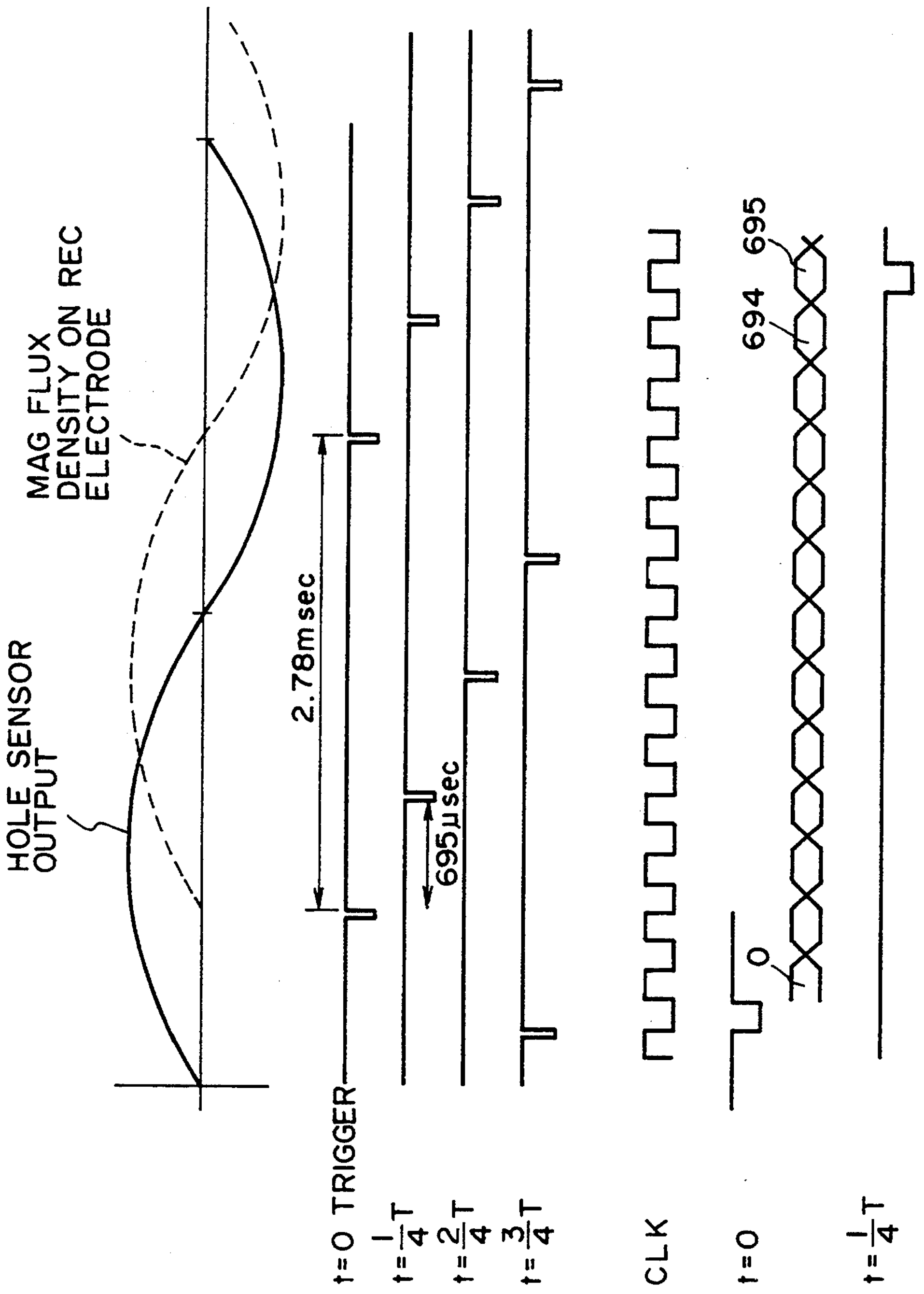
FIG. 17 is a timing chart of trigger clock signals.
Figure 18:
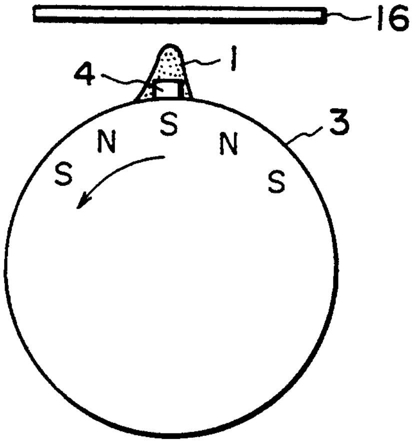
FIG. 18 is a sectional view illustrating the recording principle of the magnestylus recording apparatus.
Figure 19:
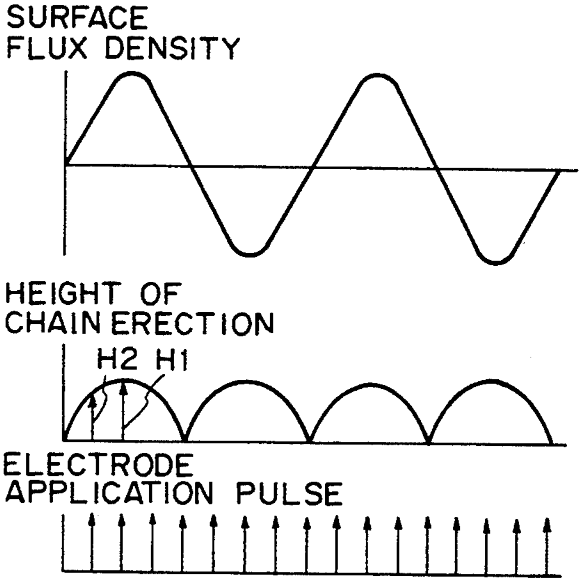
FIG. 19 shows a relation between the rotational magnetic field and a height of the chain of the toner particles.
Figure 20:
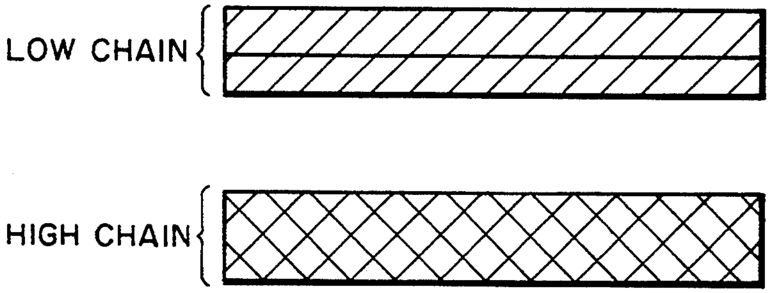
FIG. 20 shows a relation between the height of the toner particle chain and an image density.
Figure 21:
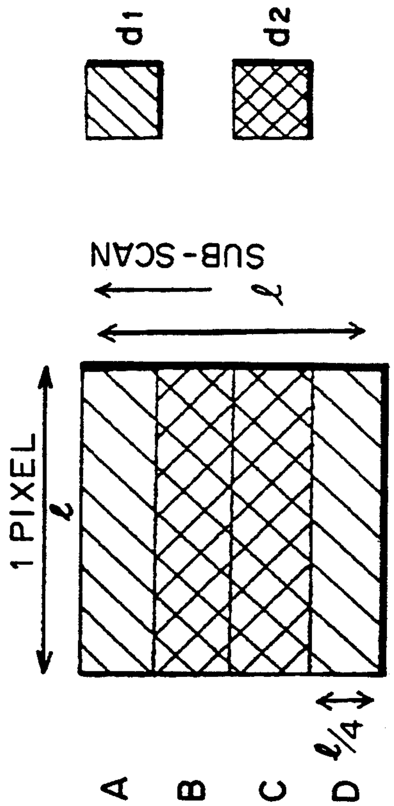
FIG. 21 shows the expressed image density of one picture element.
Figure 22:
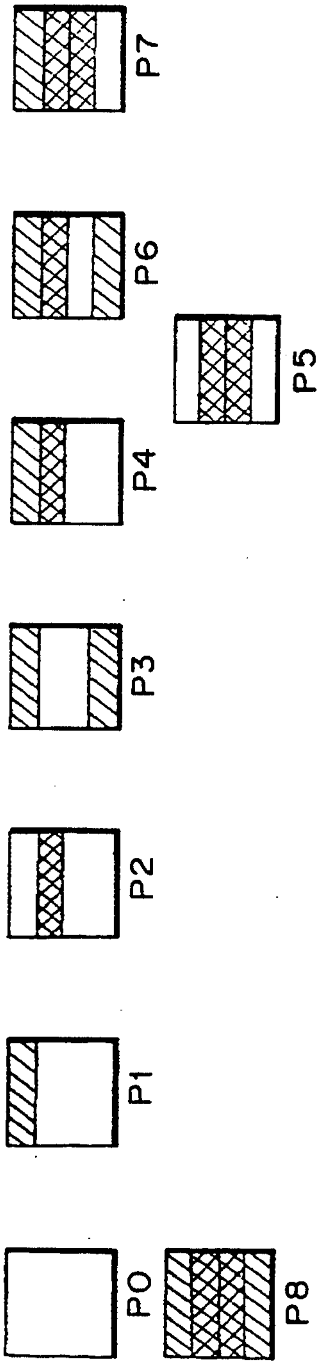
FIG. 22 shows the expressed density pattern of one picture element.
Figure 26:
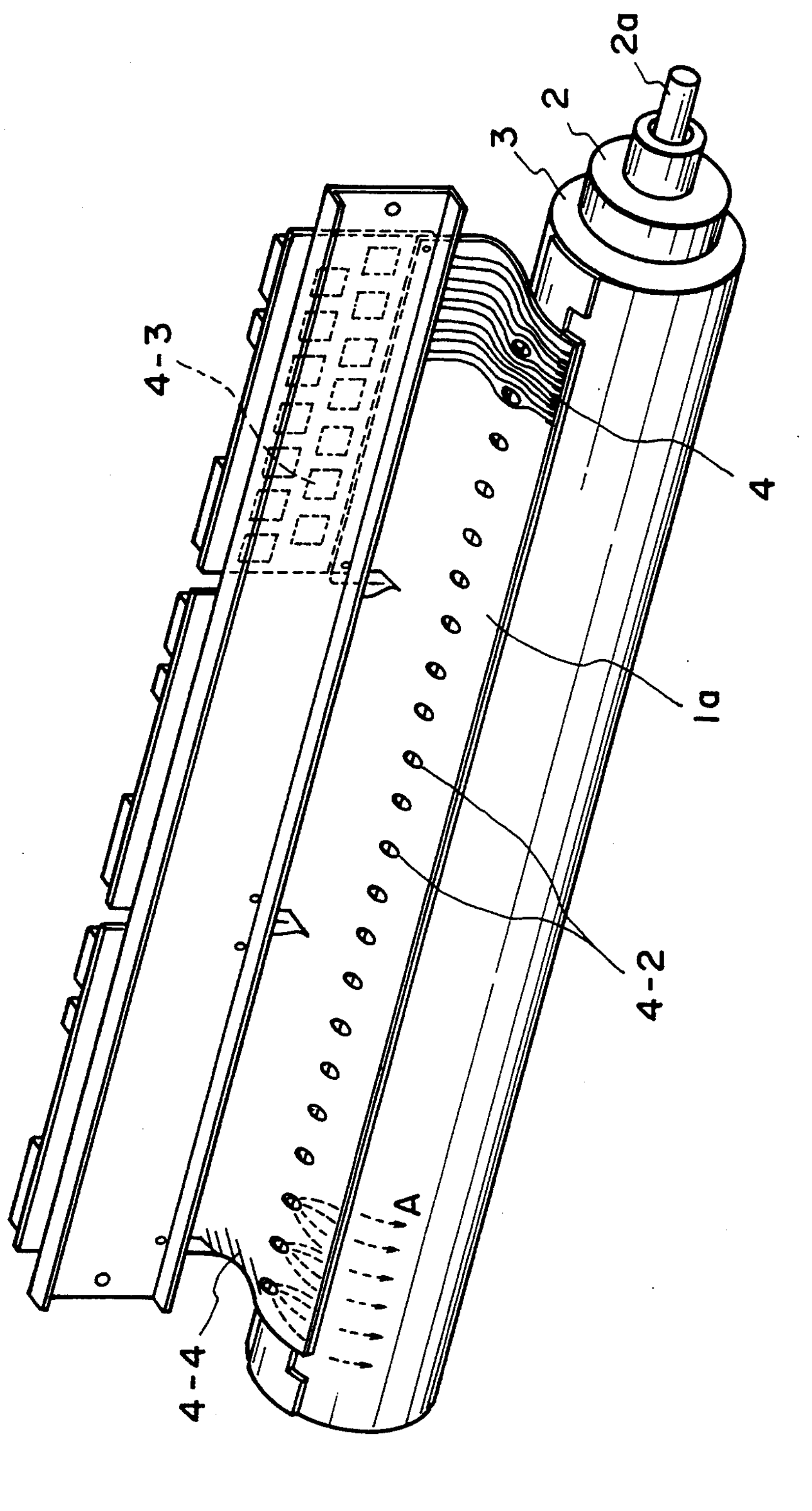
FIG. 26 is a perspective view of a recording position.

FIG. 15 illustrates the frequency dividing of the rotating magnetic field. FIG. 16 is a block diagram of a frequency divider circuit. FIG. 17 is a timing chart of trigger clock pulses. FIG. 18 illustrates the electrodes of the magnestylus recording. FIG. 19 shows a relation between the rotating magnetic field and the height of the toner erection. FIG. 20 illustrates a relation between the height of the erected toner chain and the image density. FIG. 21 illustrates the expressed density of one picture element. FIG. 22 illustrates the expressed density pattern of one picture element. FIG. 23 is a bit map of a converting ROM and a block diagram of a density pattern generating device. FIG. 24 is a graph showing a relation between a density pattern number and the density level. FIG. 25 is examples of data of the converting ROM. FIG. 26 is a perspective view of an image recording station of the image forming apparatus of this embodiment. FIG. 27 is an enlarged view of a part of the recording material.

Figure 3:
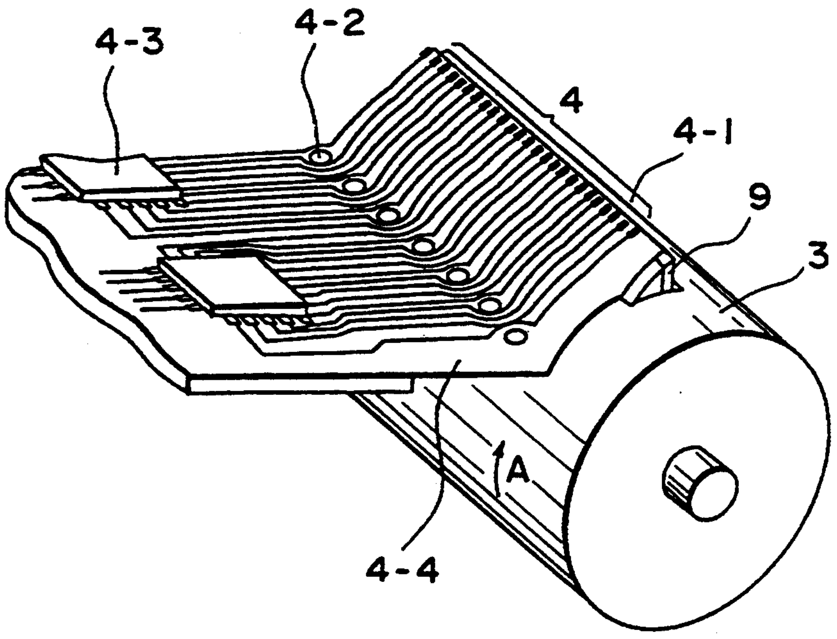
FIG. 3 is a perspective view of recording electrodes.
Figure 5:
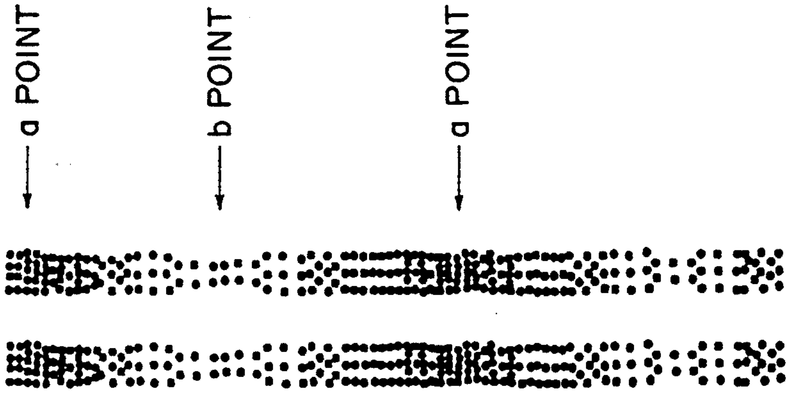
FIG. 5 shows a sample of printed output.

Referring to FIGS. 13, 26 and 27, the structure of the display apparatus will be described. The same reference numerals as in FIGS. 2 and 3 are assigned to elements having the corresponding functions, and the detailed descriptions thereof are omitted for simplicity.

The electrodes 4, as shown in FIG. 26, are connected to a recording electrode driver 4-3 for applying the recording voltage, by plural signal lines formed on a flexible print board 4-4. End portions of the signal lines are formed into exposed electrically conductive material which contributes to the recording operation, which and function as the recording electrodes. Except for the exposed end portions, the conductive material of the electrodes 4, they are covered with an insulating covering film. In the flexible printing board 4-4, plural holes are formed along a longitudinal line of the sleeve 3. The holes 4-2 are effective to introduce the toner particles conveyed on the outer periphery of the sleeve 3 to the portion where the conductive material is exposed, in the direction indicated by an arrow A. In this embodiment, the recording electrode driver 4-3 is a VFD driver (MSG 1163, available from Oki Denki Kabushiki Kaisha), and the signal lines are formed as an etched pattern of copper material.

In the sleeve 3, as shown in FIG. 1, a rotatable magnet 2 is concentrically disposed and is rotated about a rotational axis 2*a* by an unshown driving source. The rotating magnet 2 in this embodiment is a columnar magnet roller providing the maximum magnetic flux density of 300 Gausses on the magnet surface. By the rotating magnetic field formed by the rotating magnet 2, the toner 1 is conveyed while being attracted on the sleeve 3 surface.

Adjacent the recording electrodes, the image bearing member in the form of an endless belt or sheet 16 is disposed for receiving the toner 1 for the image formation. The recording sheet 16 is stretched around a driving roller 14 and a follower roller 15, which together constitute a vertical pair. The driving roller 14 is driven by an unshown driving motor to move the recording sheet 16 in a direction B in FIG. 13.

As shown in FIG. 27, the recording sheet 16 includes a surface layer 16*a* of transparent material comprising as a major component butyral resin or urethane resin material, a color layer 16*b* comprising inorganic material having a color and a binder (acrylic resin material or other plastic resin material), an evaporated conductive layer 16*c* of aluminum or ITO (indium-tin oxide), and a base material 16*d* of polyethylene terephthlate, polyethylene, polypropylene or another plastic resin material. The conductive layer 16*c* constitute a conductive portion 16*e* of carbon paste for connection with the ground level through a resistor. The surface layer 16*a* and the color layer 16*b* are electrically isolated. The color layer 16*b* uses titanium oxide ($TiO_2$), aluminum oxide ($AlO_3$) or another inorganic material providing white color as the background of the image.

In an example, the surface layer 16*a* has a thickness of 1–20 microns and a volume resistivity of $10^7$–$10^{16}$ ohm.cm; the color layer 16*b* has a thickness of 5–30 microns and a volume resistivity $10^0$–$10^7$ ohm.cm; the conductive layer 5*c* has a thickness of 800–1000 angstrom, and a volume resistivity of $10^0$–$10^2$ cm; the base member 5*d* has a thickness of 70–300 microns; and the conductive portion 16*e* has a thickness of 10–100 microns and a volume resistivity of $10^0$–$10^3$ ohm.cm. The toner 2 has a volume resistivity of $10^3$–$10^9$ ohm.cm, a volume average particle size of 10–12 microns. It comprised plastic resin material such as acrylic resin material, nylon resin material, polyethylene, or polypropylene material, carbon of 1–10% (by weight) and ferrite of 40–70% (by weight).

The image formed on the recording sheet 5 is displayed through the window 19. The recording sheet 16 is cleaned by the cleaning member 20.

Description will be made as to the matrix of the tone gradation expression of the rotating magnetic field formed at the outer periphery of the sleeve 3. The matrix will be called hereinafter "tone pattern".

The method of dividing the tone pattern is such that it is divided into four zones A, B, C and D in the subscan direction (recording sheet 16 feeding direction) as in the conventional example. The divided zones A, B, C and D correspond to the change of the magnetic flux density on the recording electrodes 4.

FIG. 16 is a block diagram of a timing generating circuit for dividing the toner erecting period into four subperiods, the erection of the toner 1 changing by the rotating magnetic field. In FIG. 16, the number of revolutions of the rotating magnet 2 is maintained constant by control means such as PLL (phase locked loop) or the like. The rotational period of the magnetic poles are predetermined by the control means. The rotational period of the rotating magnetic field is detected by a Hall sensor 21*a* functioning as the magnetic detecting means disposed inside the developing device.

A phase correcting means 21 corrects a phase difference of the rotating magnetic field on the Hall sensor 21*a* and the recording electrodes 4, using the clock-pulses generated by a period signal generating means such as a phase synchronizing oscillator or the like. In this embodiment, when the magnetic flux density of the recording electrodes 4 is 0 Gauss, one pulse basic clock is produced. Hereinafter, this signal is called "trigger clock". The trigger clock is supplied to the clock counter 22 functioning as time sharing means. Then, the clock counter 22 changes the address counter in synchronism with the basic clock with the 0 of the count of the counter when the magnetic flux density is 0 on the recording electrode 4. The counter address is sequentially compared with the register predetermined by the CPU 23, and produces timing signals A, B, C and D to switch line buffers 24A–24D which will be described hereinafter.

For example, in this embodiment, the period of the rotating magnetic field is 2.78 msec; and the delay of 1.0 msec exists from the time when the output of the Hall sensor 21*a* becomes high to the time when the magnetic field becomes 0 Gauss on the recording electrodes 4. The basic clock is 1 MHz pulses, and 695 μsec is set in the register. FIG. 17 is a timing chart of the counting operation of the clock counter 22.

The period of the toner 1 erection on the electrode 4 resulting from the change of the rotational magnetic field can be divided into four subperiods in the sub-scan direction for each of the picture elements, by the above-described structure.

Description will be made as to the production of the image data to be recorded for each of the four subperiods.

In the magnestylus recording system, the image density changes depending on the change of the magnetic field on the recording electrodes 4. As shown in FIG. 18, on the recording electrodes 4, the rotating magnetic field by the rotating magnet is formed through the sleeve 3. The magnetic toner particles 1 are formed into erected chains by the rotating magnetic field. Since the erected chains are provided by in accordance the magnetic field with lines of the rotating magnetic field, when the magnetic field changes by the rotation of the magnet, the height of a chain changes as shown in FIG. 19, Therefore, the distance from the recording sheet 16 changes. The height of the chains influences the image density. As shown in FIG. 20, the recorded image density is low when the height of the erected chains is low.

Therefore, by the height of the erected chains, that is, the phase difference between the rotating magnetic field and the erection of the toner particles on the recording electrodes 4, the density of the image formed on the sheet 16 is different even if the same voltage is applied.

In consideration of the above natural characteristics square corresponding to one picture element is taken, as shown in FIG. 21. The area of the square is divided into four zones A–D in the sub-scan direction in accordance with the period of expansion and collapse of the erection of the toner chains. By doing so, the image density gradations are expressed. Among the four zones, zones B and C are recorded with relatively high erection, and zones A and D are recorded by relatively low erection. The areas of the zones A–D are the same, but the black densities are higher in zones B and C than in zones A and D. The high and low densities are expressed by d1 and d2, respectively.

On the basis of the image density distribution for one picture element, the combinations of the zones A–D shown in FIG. 21 are arranged in order of the density, and then, as shown in FIG. 22 and in the following Table, nine levels P0–P8 are provided. In this manner, the number of tone gradations which can be expressed is remarkably increased even if the conventional dividing method is used.

TABLE 1

| Patterns | Ave. density of one pixel |
|---|---|
| P0 | 0 |
| P1 | d1/4 |
| P2 | d2/4 |
| P3 | d1/2 |
| P4 | d1/4 + d2/4 |
| P5 | d2/2 |
| P6 | d1/2 + d2/4 |
| P7 | d2/2 + d1/4 |
| P8 | d2/2 + d1/2 |

Figures 23A, 23B:
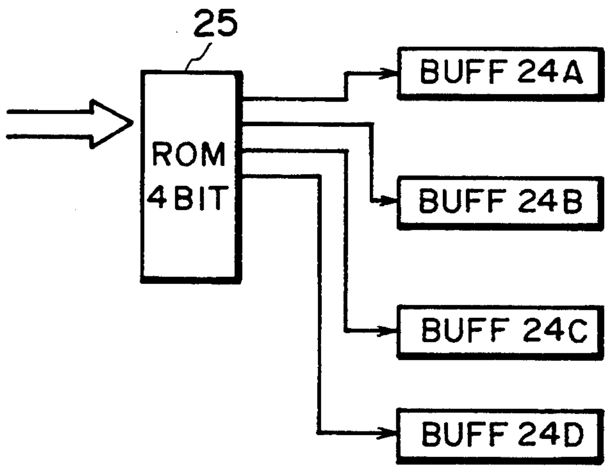
FIG. 23A and 23B are a bit map of a converting ROM and a block diagram of the density pattern generating device.
Figures 24, 25:
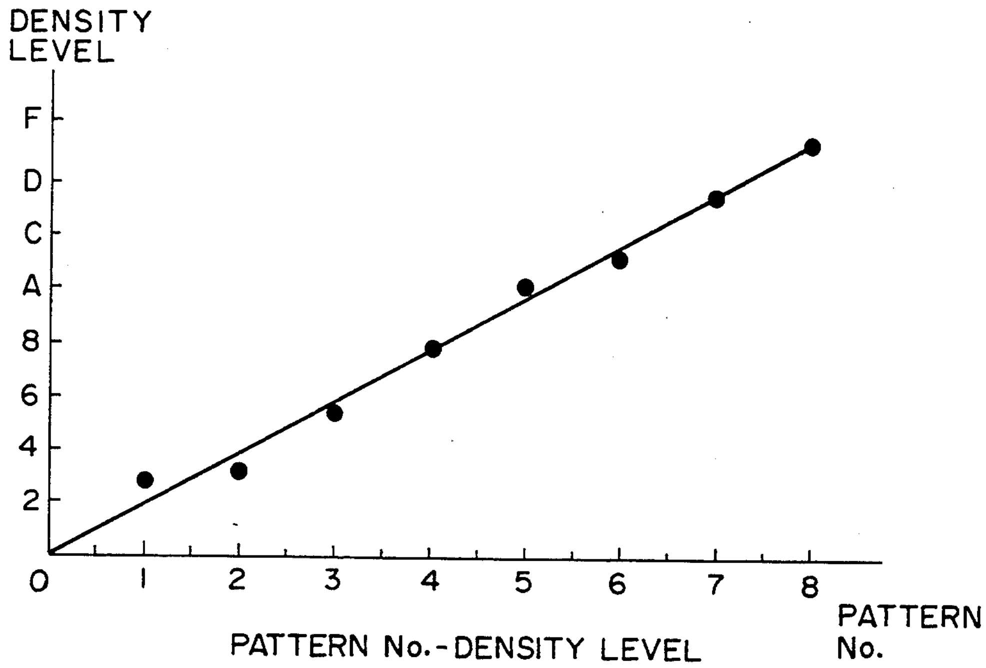
FIG. 24 is a graph showing a relation between the image pattern number and the density level.
FIG. 25 shows examples of data of the converting ROM.

FIG. 23A is a block diagram of a density pattern generating device for image data. The density pattern generating device produces the density pattern on the basis of multi-level data of the picture elements supplied from an external input apparatus (not shown). In this embodiment, multi-level image data having 16 tone gradations (0–15) of 4 bit length are externally supplied to the density pattern generating device. The density pattern generating device produces binary level data for four lines from the multi-level image data, and one of the density patterns P0–P8 is produced.

FIG. 24 is a graph showing a relation between the image density pattern number and the density level. In the graph, "o" is OD level of the density pattern, the abscissa represents the pattern numbers P0–P8, and the ordinate represents the OD level of the multi-level image data for the density levels 1–16, where 16 means solid black. The generation of the image density pattern is carried out in accordance with the graph, and the density pattern which is closest to the multi-level image data is produced by a ROM 25.

The multi-level image data are converted using a table in ROM 25, and the respective bits of the converted data are used as the output data for zones A–D. As shown in FIG. 23B (bit map), the converted data bits $b_0$–$b_3$ of ROM. 25 are produced as the image data corresponding to zones A–D divided for one picture element.

FIG. 25 shows an example of the converted data by ROM 25. In this FIG., when the level of the multi-level image data is 5, the ROM 25 produces a density pattern P3 shown in FIG. 22, that is, 1, 0, 0, 1 are supplied to zones A–D, respectively. Similarly, for the other multi-level image data, ROM 25 selects the density pattern closest to the OD level inputted.

The density pattern selected is stored in the line buffers 24A–24D for each of the regions. The stored data for the zones are read in the recording electrode driver 1*b* in accordance with the lines. A voltage signal is applied by the recording electrode driver 26, The switching timing of the line buffers 24A 24A–24D is determined by timing signals A–D. The detection signal of the Hall sensor 21*a* is used for determining the timing at which the data stored in the line buffers 24A–24D are transmitted to the recording electrode driver 26.

As described in the foregoing, the erection period of the toner 1 on the recording electrodes 4 is divided into four zones in the sub-scan direction for each of the picture elements, the signal voltages are applied in combination representing the density pattern to the zones A–D, and the number of expressed tone gradations is increased.

Embodiment 4

Figures 29, 30:
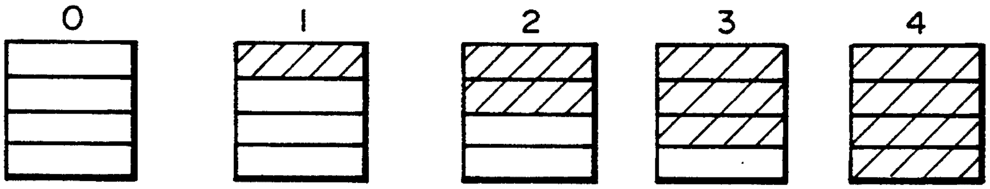
FIG. 29 shows examples of data in the converting ROM.
FIG. 30 illustrates an example of producing tone gradation.

Referring to FIGS. 28 and 29, a fourth embodiment of a density pattern generating device will be described.

In this embodiment, an error resulting when the multi-level image data are converted to density patterns by the ROM 26, is added to the next multi-level image data so as to more faithfully reproduce tone gradation.

Referring to FIG. 28A, the 4 bit multi-level image data supplied externally, are corrected by adding thereto the error which has been stored in an error register 28 after being supplied to an adder 27 (the error having occurred when one previous picture element is converted to 16–8 levels). When an overflow occurs by the adding, function Fhex is produced, and if the overflow occurs by subtracting, 0hex is produced.

A multi-level image data having been corrected by the adder 27, is converted to a density pattern by the ROM 26, and the error data produced by the pattern conversion are stored in the error register 28. The error data are allotted to the bit $b_4$–bit $b_7$ of the ROM 26, as shown in the bit map of FIG. 28B, by which the error produced by the density pattern conversion from 16 level tone gradation to 8 level tone gradation, can be compensated for in the image pattern determination for the next picture element. FIG. 29 shows an example of the converted data by the ROM 25. The converted density pattern is stored in the line buffers 29A–29D for the respective zones A–D of one picture element.

It would be considered that one picture element is divided into four zones in the sheet (image bearing member) movement direction (sub-scan direction), and the zones are filled with black as shown in FIG. 30 (D-4), in an attempt to provide 5 tone gradations. However, in this case, four magnetic poles are required to pass by the electrodes 4 in order to form one picture element. This would result in reduction of the image forming speed, or a problem with the response speed of the driver.

As described in the foregoing, according to the third and fourth embodiments of the present invention, the rotational period of the rotating magnetic field is divided into plural zones, and the tone pattern is combined in consideration of the image density in the zones, by which finer tone gradation expression than in a simple area tone gradation is possible.

As described in the foregoing according to the present invention, good tone reproduction is accomplished only by electrical signal processing, and therefore, no mechanical burden or toner scattering is increased.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus for forming a tone image, comprising:

an image bearing member;

a plurality of electrically independent recording electrodes;

rotatable magnetic field generating means having a plurality of magnetic poles for supplying magnetic toner particles to a region between said image bearing member and said recording electrodes, such that the magnetic particles form a brush in which an amount of the toner particles passing on the recording electrodes repeatedly increases and decreases in accordance with a position of the magnetic poles;

means for rotating said magnetic field generating means;

a detector for detecting a position of the magnetic poles of said magnetic field generating means while said rotating means is rotating said magnetic field generating means;

means for applying a voltage to said recording electrodes at a timing on a basis of an output of said detector, to deposit the toner particles on said image bearing member to form an image thereon; and control means for changing the timing to control an amount of the toner deposited on said image bearing member, thereby to control an image density so as to form a half tone image on said image bearing member, wherein the timing is changed in accordance with the increase and decrease of the amount of toner particles passing on the recording electrodes.

2. An apparatus according to claim 1, wherein said magnetic field generating means comprises a non-magnetic sleeve and a rotatable magnet.

3. An apparatus according to claim 2, wherein said recording electrodes are fixed on the sleeve, and face said image bearing member.

4. An apparatus according to claim 3, wherein the toner is an electrically conductive and magnetic toner.

5. An apparatus according to claim 4, wherein an image formed on said image bearing member is displayed.

6. An image forming apparatus for forming a tone image, comprising:

an image bearing member;

a plurality of electrically isolated recording electrodes;

rotatable magnetic field generating means having plural magnetic poles adjacent a peripheral surface thereof, for supplying magnetic toner to a region between said image bearing member and said recording electrodes, such that the magnetic particles form a brush in which an amount of the toner particles passing on the recording electrodes repeatedly increases and decreases in accordance with a position of the magnetic poles;

means for rotating said magnetic field generating means;

a detector for detecting a position of the magnetic poles of said magnetic field generating means while said rotating means is rotating said magnetic field generating means;

means for applying a voltage to said recording electrodes at a plurality of timings on a basis of an output of said detector, to deposit the toner particles on said image bearing member to form an image thereon; and control means for selecting, from said timings, one or more timings to actuate said voltage applying means, thereby to control an image density so as to form a half tone image on said image bearing member, wherein the timing is changed in accordance with the increase and decrease of the toner particles passing on the recording electrodes.

7. An apparatus according to claim 6, wherein said magnetic field generating means comprises a non-magnetic sleeve and a rotatable magnet.

8. An apparatus according to claim 7, wherein said recording electrodes are fixed on the sleeve, and face said image bearing member.

9. An apparatus according to claim 8, wherein the toner is an electrically conductive and magnetic toner.

10. An apparatus according to claim 9, wherein an image formed on said image bearing member is displayed.

11. An apparatus according to claim 1, wherein said detector produces an output that varies in accordance with a detected position of the magnetic poles of said rotatable magnetic field generating means.

* * * * *

UNITED STATES PATENT AND TRADEMARK OFFICE

CERTIFICATE OF CORRECTION

PATENT NO. : 5,444,470

DATED : August 22, 1995

INVENTOR(S) : Muto et al.

It is certified that error appears in the above-indentified patent and that said Letters Patent is hereby corrected as shown below:

Column 1

Line 27, "of composed" should read --composed of--.

Column 2

Line 1, "to" should be deleted; and
Line 5, "43c." should read --4-3c.--

Column 5

Line 31, "(1)in" should read --(1) in--.

Column 6

Line 38, "and" should be deleted.

Column 7

Line 48, "4, they are" should read --4 is--.

Column 8

Line 31, "5d" should read --16d--.

Column 9

Line 37, "accordance" should read --accordance with--;
Line 40, "19," should read --19.--; and
Line 50, "characteristics" should read --characteristics, one--.

UNITED STATES PATENT AND TRADEMARK OFFICE

CERTIFICATE OF CORRECTION

PATENT NO. : 5,444,470

DATED : August 22, 1995

INVENTOR(S) : Muto et al.

It is certified that error appears in the above-indentified patent and that said Letters Patent is hereby corrected as shown below:

Column 10

Line 41, "ROM. 25" should read --ROM 25--;
Line 45, "this FIG.," should read --FIG. 25,--; and
Line 56, "24A" (first occurrence) should be deleted.

Column 12

Line 55, "a" (second occurrence) should read --the--.

Signed and Sealed this

Second Day of January, 1996

Attest:

BRUCE LEHMAN

Attesting Officer

Commissioner of Patents and Trademarks